United States Patent
Yin et al.

(10) Patent No.: US 11,361,190 B2
(45) Date of Patent: Jun. 14, 2022

(54) DEEP LEARNING MODEL USED FOR IMAGE RECOGNITION AND TRAINING APPARATUS OF THE MODEL AND METHOD THEREOF

(71) Applicant: FUJITSU LIMITED, Kawasaki (JP)

(72) Inventors: Rui Yin, Beijing (CN); Zhiming Tan, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 257 days.

(21) Appl. No.: 16/654,241

(22) Filed: Oct. 16, 2019

(65) Prior Publication Data
US 2020/0134385 A1  Apr. 30, 2020

(30) Foreign Application Priority Data
Oct. 29, 2018 (CN) .......................... 201811266011.9

(51) Int. Cl.
  *G06K 9/62* (2022.01)
  *G06N 3/04* (2006.01)
  *G06N 3/08* (2006.01)
  *G06V 10/40* (2022.01)

(52) U.S. Cl.
  CPC ......... *G06K 9/6262* (2013.01); *G06K 9/6256* (2013.01); *G06N 3/0445* (2013.01); *G06N 3/084* (2013.01); *G06V 10/40* (2022.01)

(58) Field of Classification Search
  None
  See application file for complete search history.

(56) References Cited

U.S. PATENT DOCUMENTS

| | | | |
|---|---|---|---|
| 10,446,442 B2 * | 10/2019 | Butt | H01L 21/76895 |
| 10,646,156 B1 * | 5/2020 | Schnorr | G06N 3/0454 |
| 10,958,887 B2 * | 3/2021 | Kar | G06T 7/557 |
| 2017/0294091 A1 * | 10/2017 | Min | G06K 9/6274 |

(Continued)

FOREIGN PATENT DOCUMENTS

| | | |
|---|---|---|
| CN | 105913117 A | 8/2016 |
| CN | 106446930 A | 2/2017 |

(Continued)

OTHER PUBLICATIONS

Cheng Wang et al: "Manes: A Multi-task Attentional Network with Curriculum Sampling for Person Re-Identification: 15th European Conference, Munich, Germany, Sep. 8-14, 2018, Proceedings, Part IV" In: "12th European Conference on Computer Vision, ECCV 2012", Jan. 1, 2018 (Year: 2018).*

(Continued)

*Primary Examiner* — Anand P Bhatnagar
(74) *Attorney, Agent, or Firm* — Xsensus LLP

(57) ABSTRACT

Embodiments of this disclosure provide a deep learning model used for image recognition and apparatus and method thereof. The model includes a determination layer configured to determine whether features in feature maps are features of positions where objects of attention are located, and different weights are granted for the positions where the objects of attention are located and other features in performing weight and composition processing on the features. Hence, the model may be guided to be focused on attention features and make correct determination, thereby improving performance and precision of the model.

16 Claims, 6 Drawing Sheets

(56) References Cited

U.S. PATENT DOCUMENTS

| | | | | |
|---|---|---|---|---|
| 2019/0156178 | A1* | 5/2019 | Thornton | G06N 3/04 |
| 2020/0228774 | A1* | 7/2020 | Kar | G06T 7/557 |
| 2020/0273215 | A1* | 8/2020 | Wang | A61B 3/14 |
| 2020/0275073 | A1* | 8/2020 | Hamilton | H04N 19/33 |
| 2020/0275074 | A1* | 8/2020 | Hamilton | G06T 17/00 |
| 2020/0275076 | A1* | 8/2020 | Hamilton | H04N 13/302 |

FOREIGN PATENT DOCUMENTS

| | | |
|---|---|---|
| CN | 106600538 A | 4/2017 |
| CN | 107451552 A | 12/2017 |

OTHER PUBLICATIONS

Cai, J. et al., "Preliminary Study on Hand Gesture Recognition Based on Convolutional Neural Network," Computer Systems & Applications, vol. 24, No. 4, 2015, pp. 113-117 (See English Abstract).

Cheng Wang et al: "Manes: A Multi-task Attentional Network with Curriculum Sampling for Person Re-Identification 15th European Conference, Munich, Germany, Sep. 8-14, 2018, Proceedings, Part IV" In: "12th European Conference on Computer Vision, ECCV 2012", Jan. 1, 2018 (Jan. 1, 2018), Springer Berlin Heidelberg, Berlin, Heidelberg 031559, XP055666874, ISSN: 0302-9743 ISBN: 978-3-540-73108-5 vol. 11208, pp. 384-400.

Hao Liu et al: "End-to-End Comparative Attention Networks for Person Re-Identification", IEEE Transactions on Image Processing., vol. 26, No. 7, May 3, 2017 (May 3, 2017), pp. 3492-3506, XP055541087, US ISSN: 1057-7149, DOI: 10.1109/TIP.2017.2700762.

Extended European Search Report dated Feb. 19, 2020, issued in corresponding European Patent Application No. 19203573.1-1207.

Office Action issued by the European Patent Office for corresponding European Patent Application No. 19203573.1 dated Apr. 5, 2022.

* cited by examiner

DEEP LEARNING MODEL USED FOR IMAGE RECOGNITION AND TRAINING APPARATUS OF THE MODEL AND METHOD THEREOF

CROSS-REFERENCE TO RELATED APPLICATION

The present application claims priority to CN 201811266011.9, filed Oct. 29, 2018, the entire contents of which are incorporated herein by reference.

TECHNICAL FIELD

This disclosure relates to the field of information technologies, and in particular to a deep learning model used for image recognition and a training apparatus of the model and a method thereof.

BACKGROUND

Studies of the field of computer vision have made a great progress in recent years with the help of deep learning. The deep learning refers to an algorithm set in which various machine-learning algorithms are used in a hierarchical neural network to solve problems of images, and texts, etc. The core of the deep learning is feature learning, aiming at acquiring hierarchical feature information via the hierarchical neural network, thereby solving an important difficult problem that features need to be artificially designed. A common deep learning model, for example, includes a convolutional neural network (CNN), which makes image features having a great number of data be able to be trained by continually decreasing dimensions of the image features.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

It was found by inventors that in visualization of feature maps outputted by a convolutional layer, there exist some problems. For example, although correct determination is made by a deep learning model, features extracted by the deep learning model are not related to real values. When the deep learning model learns wrong information during training, the deep learning model possesses no good universality during training. And the deep learning model performs identical processing on features taken as training samples during training, which may result in performance and precision of the model to be limited.

Embodiments of this disclosure provide a deep learning model used for image recognition and training apparatus of the model and method thereof. The model includes a determination layer configured to determine whether features in feature maps are features of positions where objects of attention are located, and different weights are granted for the positions where the objects of attention are located and other features in performing weight and composition processing on the features. Hence, the model may be guided to be focused on attention features and make correct determination, thereby improving performance and precision of the model.

According to a first aspect of the embodiments of this disclosure, there is provided a deep learning model used for image recognition, the model including: a plurality of convolutional layers configured to extract features from input image in turn and output a plurality of feature maps of identical sizes; a determination layer configured to, according to positions where objects of attention in the input image are located, determine whether features related to positions contained in the feature maps are features of the positions where the objects of attention are located; a compositing layer configured to, according to an output result of the determination layer, perform weight and composition processing on the features in the plurality of feature maps outputted by the plurality of convolutional layers, weights of the features of the positions where the objects of attention are located being different from weights of other features; and a fully-connected layer configured to output a recognition result according to the multiple feature maps after being weight and composition processed by the compositing layer.

According to a second aspect of the embodiments of this disclosure, there is provided a training apparatus of the deep learning model as described in the first aspect of the embodiments of this disclosure, the apparatus including: an inputting unit configured to input a training image into the plurality of convolutional layers of the deep learning model; a first calculating unit configured to calculate an attention loss according to the output result of the determination layer of the deep learning model and real values of positions where the preset objects of attention are located; a second calculating unit configured to calculate a classification loss according to the output result of the fully-connected layer of the deep learning model and a preset real value of classification; and an adjusting unit configured to perform back propagation according to the attention loss and the classification loss to adjust parameters of the plurality of convolutional layers and the determination layer of the deep learning model.

According to a third aspect of the embodiments of this disclosure, there is provided an electronic device, including the apparatus as described in the second aspect.

According to a fourth aspect of the embodiments of this disclosure, there is provided a training method of the deep learning model as described in the first aspect of the embodiments of this disclosure, the method including: inputting a training image into the plurality of convolutional layers of the deep learning model; calculating an attention loss according to the output result of the determination layer of the deep learning model and real values of positions where the preset objects of attention are located; calculating a classification loss according to the output result of the fully-connected layer of the deep learning model and a preset real value of classification; and performing back propagation according to the attention loss and the classification loss, to adjust parameters of the plurality of convolutional layers and the determination layer of the deep learning model.

An advantage of the embodiments of this disclosure exists in that as the model includes a determination layer configured to determine whether features in feature maps are features of positions where objects of attention are located and different weights are granted for the positions where the objects of attention are located and other features in performing weight and composition processing on the features, the model may be guided to be focused on attention features and make correct determination, thereby improving performance and precision of the model.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
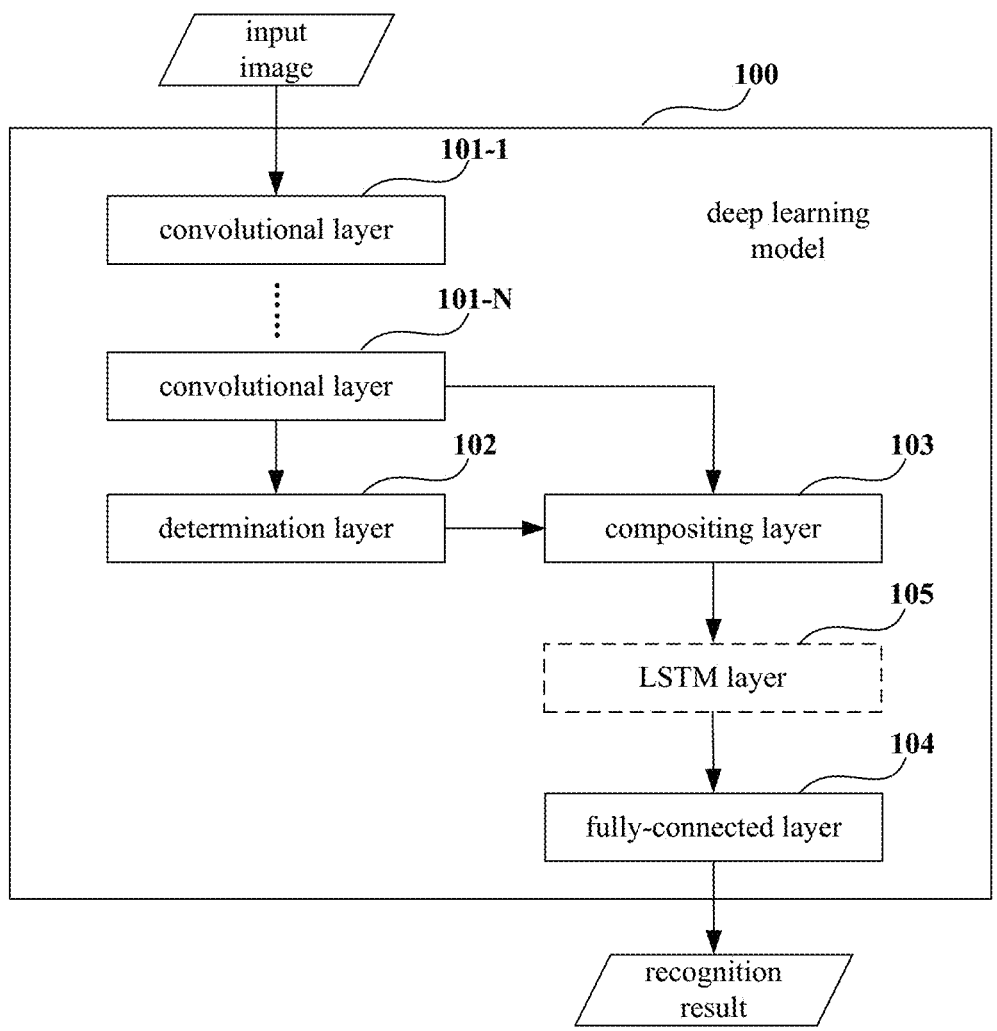
FIG. 1 is a schematic diagram of the deep learning model used for image recognition of Embodiment 1 of this disclosure.

The embodiment of this disclosure provides a deep learning model used for image recognition. FIG. 1 is a schematic diagram of the deep learning model used for image recognition of Embodiment 1 of this disclosure. As shown in FIG. 1, a deep learning model 100 includes:

a plurality of convolutional layers 101-1~101-N configured to extract features from an input image in turn and output a plurality of feature maps of identical sizes;

a determination layer 102 configured to, according to positions where objects of attention in the input image are located, determine whether features related to positions contained in the feature maps are features of the positions where the objects of attention are located;

a compositing layer 103 configured to, according to an output result of the determination layer 102, perform weight and composition processing on the features in the plurality of feature maps outputted by the plurality of convolutional layers, weights of the features of the positions where the objects of attention are located being different from weights of other features; and a fully-connected layer 104 configured to output a recognition result according to the plurality of feature maps after being weight and composition processed by the compositing layer 103.

It can be seen from the above embodiment that as the model includes a determination layer configured to determine whether features in feature maps are features of positions where objects of attention are located and different weights are granted for the positions where the objects of attention are located and other features in performing weight and composition processing on the features, the model may be guided to be focused on attention features and make correct determination, thereby improving performance and precision of the model.

In this embodiment, existing network structures may be used for the plurality of convolution layers 101-1~101-N, N being an integer greater than or equal to 2, and the number of convolution layers being able to be set according to actual requirements.

In this embodiment, the plurality of convolution layers 101-1~101-N perform feature extraction on the input image in turn, and output plurality of feature maps of identical sizes, the input image being various types of images, such as at least one frame of a video.

In this embodiment, the extracted features may be various features taken as input data, such as outlines, textures and brightness.

In this embodiment, the plurality of convolution layers 101-1~101-N perform feature extraction on the input image to obtain a plurality of feature maps of identical sizes. For example, the plurality of feature maps of identical sizes may be expressed as c×m×n; where, c denotes the number of the feature maps, which is an integer greater than or equal to 2, and is determined by the number of convolutional kernels of the convolutional layers; m×n denotes the sizes of the feature maps, which are determined by size of the input image and convolutional steps of the convolutional layers; m denotes a size of a lengthwise direction of the features maps, that is, there exist m features in the lengthwise direction; and n denotes a size of a widthwise direction of the features maps, that is, there exist n features in the widthwise direction; m and n are positive integers and may be identical or different.

After the plurality of convolutional layers 101-1~101-N output a plurality of feature maps of identical sizes, the determination layer 102, according to the positions where the objects of attention in the input image are located, determines whether the features related to positions contained in the feature maps are features of the positions where the objects of attention are located.

In this embodiment, the objects of attention are predetermined according to actual requirements. For example, when shooting in a basketball video image needs to be recognized, the player and the basketball may be taken as the objects of attention. Positions of the player and the basketball are positions where the objects of attention are located. For the convenience of calculation, positions where blocks including the player and the basketball are located may be taken as the positions where the objects of attention are located.

Figure 2:
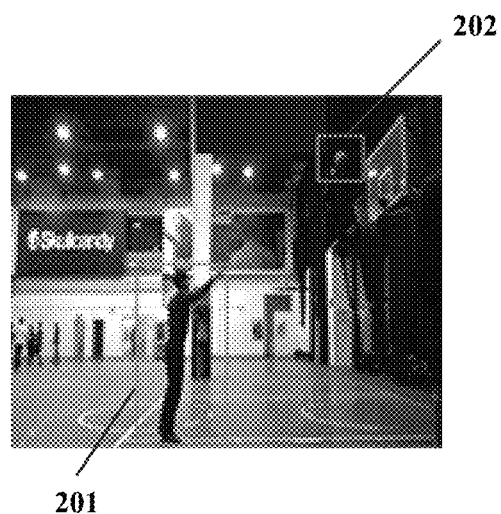
FIG. 2 is an input image of Embodiment 1 of this disclosure.

FIG. 2 is an input image of Embodiment 1 of this disclosure. As shown in FIG. 2, a block 201 where the player is located and an area in which a block 202 where the basketball is located is in may be taken as the positions where the objects of attention are located.

After the determination layer 102 obtains the positions where the objects of attention are located in the input image, it may determine which features in the feature maps are features of the positions where the objects of attention are located, and output a result of determination. In this way, the compositing layer 103, according to the output result of the determination layer 102, performs weight and composition processing on the features in the plurality of feature maps outputted by the plurality of convolutional layers 101-1~101-N, the weights of the features of the positions where the objects of attention are located being different from the weights of the other features.

In this embodiment, the weights of the features of the positions where the objects of attention are located may be set to be greater than the weights of other features. For example, the weights of the features of the positions where the objects of attention are located are set to be greater than or equal to 1, and the weights of other features are set to be values greater than or equal to 0 and less than 1.

In addition, it may also be that the weights of the features of the positions where the objects of attention are located are set to be less than the weights of other features. In this embodiment, as long as the weights of the two types of features are different, the model may distinguish the two types of features, so as to perform different processing.

In this embodiment, the compositing layer 103 may multiply the plurality of feature maps by the weights of the features related to positions contained in the feature maps to obtain the plurality of feature maps after being weight and composition processed.

Figure 3:
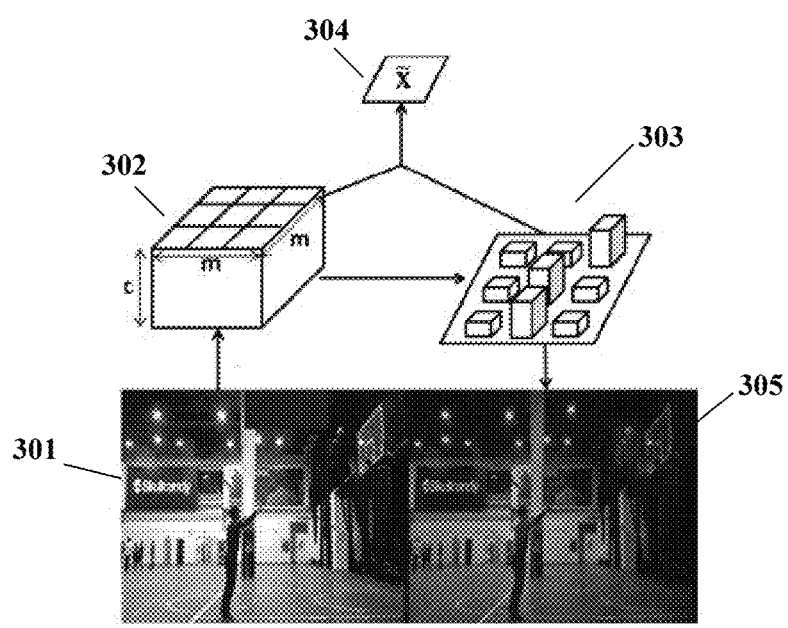
FIG. 3 is a schematic diagram of performing weight and composition processing on a plurality of feature maps of the input image of Embodiment 1 of this disclosure.

FIG. 3 is a schematic diagram of performing weight and composition processing on plurality of feature maps of the input image of Embodiment 1 of this disclosure. As shown in FIG. 3, 301 denotes an input image, 302 denotes a plurality of feature maps X extracted from the input image 301, the number of the feature maps being c, and sizes of the feature maps being m×m, and 303 denotes histograms of weights of the features in a feature map, weights of larger heights being weights of the features of the positions where the objects of attention are located, and weights of smaller heights being weights of the other features. The plurality of feature maps X denoted by 302 are multiplied by the weights of the features denoted by 303 in a feature map to obtain the plurality of feature maps X̃ denoted by 304 after being weight and composition processed. And 305 denotes an image obtained after the features of the positions where the objects of attention are located are enhanced (i.e. added with weights).

In this embodiment, the plurality of feature maps after being weight and composition processed by the compositing layer 103 are inputted into the fully-connected layer 104 to obtain a recognition result.

In this embodiment, an existing network structure may be used for the fully-connected layer 104.

The recognition result is a recognition result of the input image. For example, for a model aiming at recognizing "shooting", the input image shown in FIG. 2 is inputted, and an obtained output result may be: "shooting: 0.8; non-shooting: 0.2", that is, a probability of shooting is 0.8, and a probability of not shooting is 0.2.

The deep learning model 100 of this embodiment may be applicable to various specific fields. For example, the deep learning model 100 may be used for motion detection, such as an action of "shooting" in the above example.

For another example, the deep learning model 100 may also be used for event detection, such as detection of a traffic accident, by the deep learning model 100 the traffic accident may be directly detected without being limited to transformation of scenarios, whereas a conventional method requires manual formulation of complex rules.

When it is used for event detection, the input image is required to include a temporally consecutive frame sequence, such as a consecutive frame sequence of a surveillance video.

And the deep learning model 100 may further include:

a long short-term memory (LSTM) layer 105 provided between the compositing layer 103 and the fully-connected layer 104.

In this way, by setting the LSTM layer in the deep learning model, recognition may be performed on the temporally consecutive frame sequence by using its characteristics that it memorizes useful information and forgets useless information along with the time.

It can be seen from the above embodiment that as the model includes a determination layer configured to determine whether features in feature maps are features of positions where objects of attention are located and different weights are granted for the positions where the objects of attention are located and other features in performing weight and composition processing on the features, the model may be guided to be focused on attention features and make correct determination, thereby improving performance and precision of the model.

Embodiment 2

The embodiment of this disclosure provides a training apparatus of the deep learning model used for image recognition described in Embodiment 1. A structure of the deep learning model is as shown in FIG. 1, and the deep learning model 100 includes a plurality of convolutional layers 101-1~101-N, a determination layer 102, a compositing layer 103 and a fully-connected layer 104.

Figure 4:
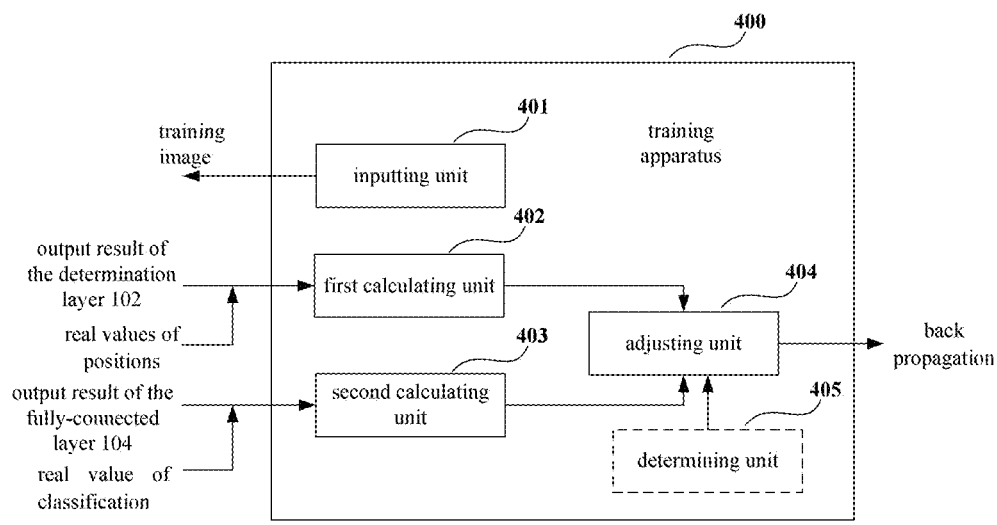
FIG. 4 is a schematic diagram of the training apparatus of Embodiment 2 of this disclosure.

FIG. 4 is a schematic diagram of the training apparatus of Embodiment 2 of this disclosure. As shown in FIG. 4, a training apparatus 400 includes:

an inputting unit 401 configured to input a training image into the plurality of convolutional layers 101-1~101-N of the deep learning model 100;

a first calculating unit 402 configured to calculate an attention loss according to the output result of the determination layer 102 of the deep learning model 100 and real values of positions where the preset objects of attention are located;

a second calculating unit 403 configured to calculate a classification loss according to the output result of the fully-connected layer 104 of the deep learning model 100 and a preset real value of classification; and an adjusting unit 404 configured to perform back propagation according to the attention loss and the classification loss to adjust parameters of the plurality of convolutional layers 101-1~101-N and the determination layer 102 of the deep learning model 100.

Hence, by performing back propagation according to the attention loss and the classification loss, the deep learning model 100 may be efficiently and quickly trained.

In this embodiment, the training image may be an image of various types, and particular contents thereof may be determined according to a demand for recognition of the deep learning model. For example, when its demand for recognition is an action of "shooting", a plurality of frame images of a video of playing basketball may be taken as the training images.

In this embodiment, the training may be performed in a convolutional architecture for fast feature embedding (Caffe).

In this embodiment, the first calculating unit 402 may calculate an accumulative value of differences between probabilities that the positions where the features outputted by the determination layer are located are the objects of attention and real values of the positions being the objects of attention to obtain the attention loss.

For example, the first calculating unit 402 may calculate the attention loss according to formula (1) below:

$$Loss_{attention} = \sum_{\substack{i=1 \\ j=1}}^{m} (l_{i,j} - \hat{l}_{i,j})^2; \quad (1)$$

where, $Loss_{attention}$ denotes the attention loss, $l_{i,j}$ denotes probabilities that features (i,j) outputted by the determination layer 102 are the features of the positions where the objects of attention are located, $\hat{l}_{i,j}$ denotes real values that the features (i,j) are the positions where the objects of attention are located, and m denotes sizes of lengths and widths of the feature maps, i,j,m being all positive integers.

Figure 5:
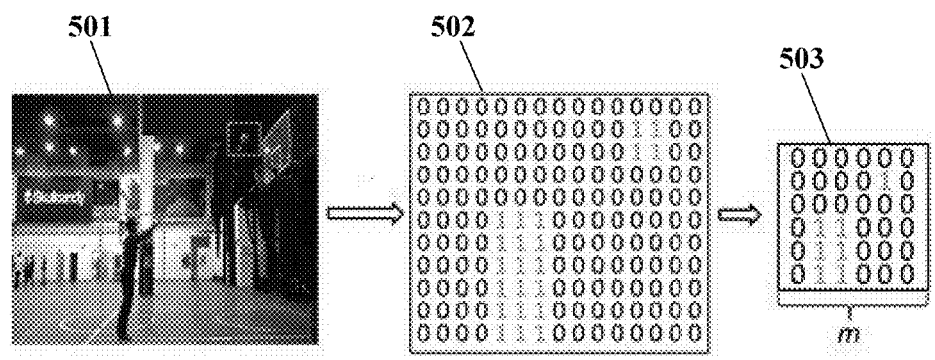
FIG. 5 is a schematic diagram of setting of real values of the objects of attention of Embodiment 2 of this disclosure.

FIG. 5 is a schematic diagram of setting of real values of the objects of attention of Embodiment 2 of this disclosure. As shown in FIG. 5, the true values of the positions where the objects of attention are located in the input image 501 are labeled to obtain a real value map 502 of the positions of the objects of attention; where, label "1" denotes that the positions are the positions where the objects of attention are located, label "0" denotes that the positions are not the positions where the objects of attention are located. As the features of the input image are performed with dimensionality reduction after they pass the convolutional layer, the real value map 502 of the positions need to be performed with dimensionality reduction to obtain a value map 503 of positions after the dimensionality reduction, with its size being identical to those of the feature maps, i.e. m×m.

In this embodiment, the second calculating unit 403 calculates the classification loss according to the output result of the fully-connected layer 104 and the preset real value of classification. Reference may be made to the related art for a particular method for calculating the classification loss.

For example, when the image shown in FIG. 2 is inputted as the training image, an obtained output result may be: "shooting: 0.7; non-shooting: 0.3", that is, a probability of shooting is 0.7, and a probability of not shooting is 0.3. When a preset real value of classification for the training image is "1", the classification loss is 1−0.7=0.3.

In this embodiment, the adjusting unit 404 performs back propagation according to the attention loss and the classification loss to adjust the parameters of the plurality of convolutional layers 101-1~101-N and the determination layer 102.

For example, the adjusting unit 404 performs back propagation according to a weighted sum of the attention loss and the classification loss to adjust the parameters of the plurality of convolutional layers 101-1~101-N and the determination layer 102.

For example, the weighted sum of the attention loss and the classification loss may be calculated according to formula (2) below:

$$Loss = \lambda_1 Loss_{attention} + \lambda_2 Loss_{classification};$$

where, $Loss_{attention}$ denotes the attention loss, $Loss_{classification}$ denotes the classification loss, Loss denotes the weighted sum of the attention loss and the classification loss, and $\lambda_1$ and $\lambda_2$ respectively denote the weights of the attention loss and the classification loss.

In this embodiment, reference may be made to the related art for a method for performing back propagation by the adjusting unit 404 to adjust the parameters of the plurality of convolutional layers 101-1~101-N and the determination layer 102. For example, weighting parameters and offset parameters of the layers are adjusted according to partial derivatives of the weighted sum of the attention loss and the classification loss for weighting parameters and offset parameters.

In this embodiment, the training apparatus 400 may further include:

a determining unit 405 configured to determine respective weights of the attention loss and the classification loss. For example, the determining unit 405 determines the respective weights according to actual requirements.

Figure 6:
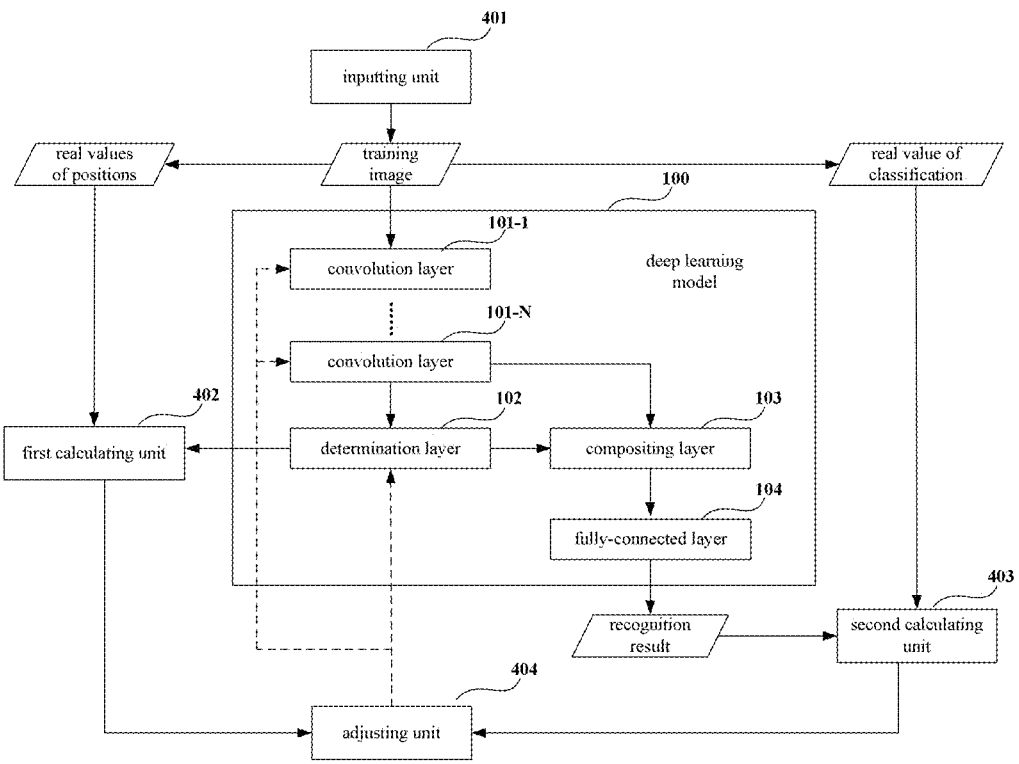
FIG. 6 is a schematic diagram of a training process of Embodiment 2 of this disclosure.

FIG. 6 is a schematic diagram of a training process of Embodiment 2 of this disclosure. As shown in FIG. 6, the inputting unit 401 inputs the training image into the deep learning model to be trained, and the real values of the positions of the objects of attention and the real value of classification are determined according to the training image; the first calculating unit 402 calculates the attention loss according to the real values of the positions and the output result of the determination layer 102; the second calculating unit 403 calculates the classification loss according to the real value of classification and the output result of the fully-connected layer 104; and the adjusting unit 404 performs back propagation according to the weighted sum of the attention loss and the classification loss to adjust the parameters of the plurality of convolutional layers 101-1~101-N and the determination layer 102; the arrows in dotted lines denote adjustment performed on the parameters of these layers, and when the weighted sum of the attention loss and the classification loss is converged, it may be deemed that the training is finished.

It can be seen from the above embodiment that by performing back propagation according to the attention loss and the classification loss, the deep learning model described in Embodiment 1 may be obtained by efficient and quick training.

Embodiment 3

Figure 7:
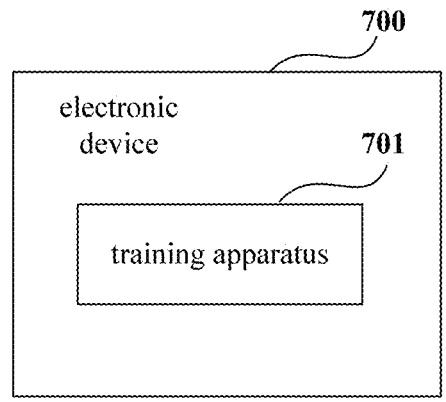
FIG. 7 is a schematic diagram of the electronic device of Embodiment 3 of this disclosure.

The embodiment of this disclosure provides an electronic device. FIG. 7 is a schematic diagram of the electronic device of Embodiment 3 of this disclosure. As shown in FIG. 7, an electronic device 700 includes a training apparatus 701, which is used to train the deep learning model described in Embodiment 1, a structure and functions of the training apparatus 701 being identical to those described in Embodiment 2, which shall not be described herein any further.

Figure 8:
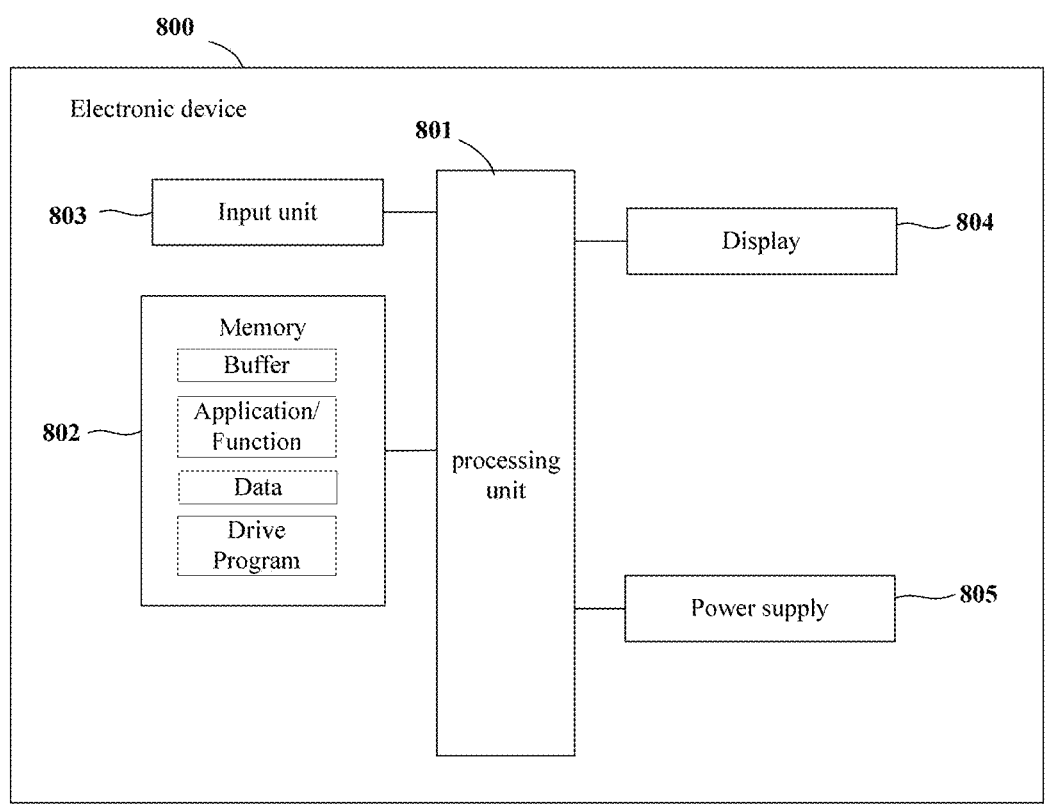
FIG. 8 is a block diagram of a systematic structure of the electronic device of Embodiment 3 of this disclosure.

FIG. 8 is a block diagram of a systematic structure of the electronic device of Embodiment 3 of this disclosure. As shown in FIG. 8, an electronic device 800 may include a processing unit 801 and a memory 802, the memory 802 being coupled to the processing unit 801. It should be noted that this figure is illustrative only, and other types of structures may also be used, so as to supplement or replace this structure and achieve a telecommunications function or other functions.

As shown in FIG. 8, the electronic device 800 may further include an input unit 803, a display 804 and a power supply 805.

In one implementation, the functions of the training apparatus described in Embodiment 2 may be integrated into the central processing unit 801. The processing unit 801 may be configured to: input a training image into the plurality of convolutional layers of the deep learning model; calculate an attention loss according to the output result of the determination layer of the deep learning model and real values of positions where the preset objects of attention are located; calculate a classification loss according to the output result of the fully-connected layer of the deep learning model and a preset real value of classification; and perform back propagation according to the attention loss and the classification loss to adjust parameters of the plurality of convolutional layers and the determination layer of the deep learning model.

For example, the calculating an attention loss according to the output result of the determination layer of the deep learning model and real values of positions where the preset objects of attention are located includes: calculating an accumulative value of differences between probabilities that the positions where the features output by the determination layer are located are the objects of attention and real values of the positions being the objects of attention to obtain the attention loss.

For example, the performing back propagation according to the attention loss and the classification loss, so as to adjust parameters of the plurality of convolutional layers and the determination layer of the deep learning model, includes: performing back propagation according to a weighted sum of the attention loss and the classification loss, so as to adjust the parameters of the plurality of convolutional layers and the determination layer of the deep learning model.

For example, the central processing unit 801 may be configured to: determine respective weights of the attention loss and the classification loss.

In another implementation, the training apparatus described in Embodiment 2 and the processing unit 801 may be configured separately. For example, the training apparatus may be configured as a chip connected to the processing unit 801, with its functions being realized under control of the processing unit 801.

In this embodiment, the electronic device 800 does not necessarily include all the parts shown in FIG. 8.

As shown in FIG. 8, the processing unit 801 is sometimes referred to as a controller or control, which may include a microprocessor or other processor devices and/or logic devices, and the processing unit 801 receives input and controls operations of every component of the electronic device 800.

The memory 802 may be, for example, one or more of a buffer memory, a flash memory, a hard drive, a mobile medium, a volatile memory, a nonvolatile memory, or other suitable devices, which may store the information on configuration, etc., and furthermore, store programs executing related information. And the central processing unit 801 may execute programs stored in the memory 802, so as to realize information storage or processing, etc. Functions of other parts are similar to those of the related art, which shall not be described herein any further. The parts of the electronic device 800 may be realized by specific hardware, firmware, software, or any combination thereof, without departing from the scope of this disclosure.

It can be seen from the above embodiment that by performing back propagation according to the attention loss and the classification loss, the deep learning model described in Embodiment 1 may be obtained by efficient and quick training.

Embodiment 4

Figure 9:
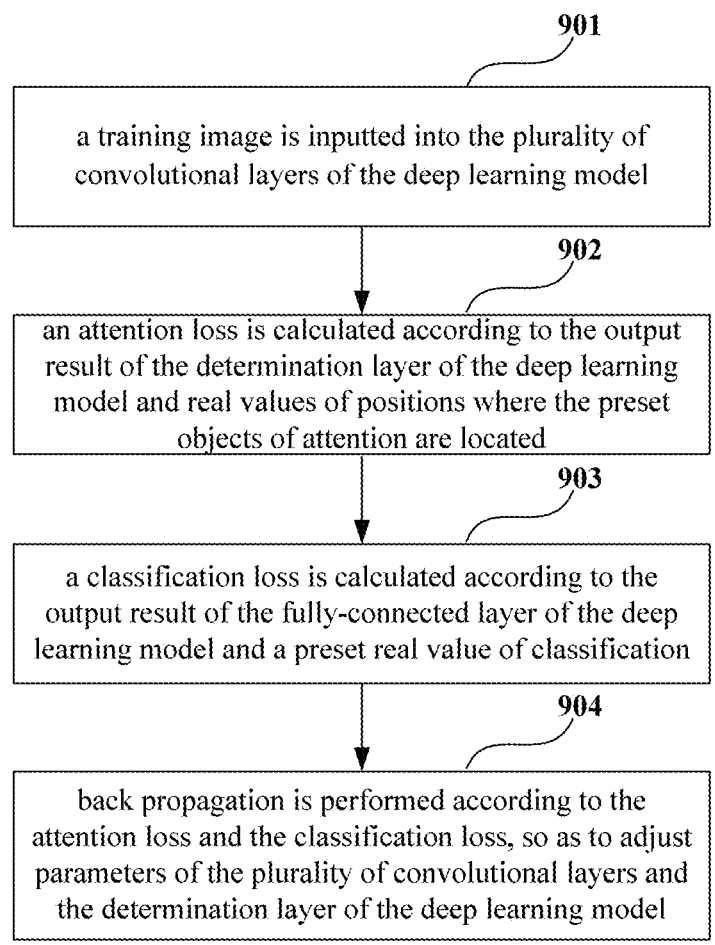
FIG. 9 is a schematic diagram of the training method of Embodiment 4 of this disclosure.

The embodiment of this disclosure provides a training method of the deep learning model used for image recognition described in Embodiment 1, the method corresponding to the training apparatus described in Embodiment 2. FIG. 9 is a schematic diagram of the training method of Embodiment 4 of this disclosure. As shown in FIG. 9, the method includes:

Step 901: a training image is inputted into the plurality of convolutional layers of the deep learning model;

Step 902: an attention loss is calculated according to the output result of the determination layer of the deep learning model and real values of positions where the preset objects of attention are located;

Step 903: a classification loss is calculated according to the output result of the fully-connected layer of the deep learning model and a preset real value of classification; and Step 904: back propagation is performed according to the attention loss and the classification loss, so as to adjust parameters of the plurality of convolutional layers and the determination layer of the deep learning model.

In this embodiment, step 902 and step 903 may be executed sequentially. For example, step 902 is executed first, and then step 903 is executed; or step 903 is executed first, and then step 902 is executed. Furthermore, it may also be that step 902 and step 903 are executed simultaneously, and an order of execution of step 902 and step 903 is not limited in this embodiment.

In this embodiment, particular implementations of the above steps are identical to those described in Embodiment 2, which shall not be described herein any further.

It can be seen from the above embodiment that by performing back propagation according to the attention loss and the classification loss, the deep learning model described in Embodiment 1 may be obtained by efficient and quick training.

An embodiment of the present disclosure provides a computer readable program, which, when executed in a training apparatus of a deep learning model or an electronic device, may cause a computer to carry out the training method of a deep learning model as described in Embodiment 4 in the training apparatus of a deep learning model or the electronic device.

An embodiment of the present disclosure provides a computer storage medium, including a computer readable program, which may cause a computer to carry out the training method of a deep learning model as described in Embodiment 4 in a training apparatus of a deep learning model or an electronic device.

The carrying out the training method of a deep learning model in the training apparatus of a deep learning model or the electronic device described with reference to the embodiments of this disclosure may be directly embodied as hardware, software modules executed by a processor, or a combination thereof. For example, one or more functional block diagrams and/or one or more combinations of the functional block diagrams shown in FIG. 4 may either correspond to software modules of procedures of a computer program, or correspond to hardware modules. Such software modules may respectively correspond to the steps shown in FIG. 9. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 4 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in FIG. 4 may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. A deep learning model used for image recognition, the model including:

a plurality of convolutional layers configured to extract features from an input image in turn and output a plurality of feature maps of identical sizes;

a determination layer configured to, according to positions where objects of attention in the input image are located, determine whether features related to positions contained in the feature maps are features of the positions where the objects of attention are located;

a compositing layer configured to, according to an output result of the determination layer, perform weight and composition processing on the features in the plurality of feature maps outputted by the plurality of convolutional layers, weights of the features of the positions where the objects of attention are located being different from weights of other features; and a fully-connected layer configured to output a recognition result according to the plurality of feature maps after being weight and composition processed by the compositing layer.

Supplement 2. The deep learning model according to supplement 1, wherein, the compositing layer multiplies the plurality of feature maps by the weights of the features related to positions contained in the feature maps to obtain the plurality of feature maps after being weight and composition processed.

Supplement 3. The deep learning model according to supplement 1, wherein the deep learning model further includes:

a long short-term memory layer provided between the compositing layer and the fully-connected layer;

and the input image includes a temporally consecutive frame sequence.

Supplement 4. A training apparatus of the deep learning model according to any one of supplements 1-3, the apparatus including:

an inputting unit configured to input a training image into the plurality of convolutional layers of the deep learning model;

a first calculating unit configured to calculate an attention loss according to the output result of the determination layer of the deep learning model and real values of positions where the preset objects of attention are located;

a second calculating unit configured to calculate a classification loss according to the output result of the fully-connected layer of the deep learning model and a preset real value of classification; and an adjusting unit configured to perform back propagation according to the attention loss and the classification loss to adjust parameters of the plurality of convolutional layers and the determination layer of the deep learning model.

Supplement 5. The apparatus according to supplement 4, wherein, the first calculating unit calculates an accumulative value of differences between probabilities that the positions where the features outputted by the determination layer are located are the objects of attention and real values of the positions being the objects of attention to obtain the attention loss.

Supplement 6. The apparatus according to supplement 4, wherein, the adjusting unit performs back propagation according to a weighted sum of the attention loss and the classification loss, so as to adjust the parameters of the plurality of convolutional layers and the determination layer of the deep learning model.

Supplement 7. The apparatus according to supplement 6, wherein the apparatus further includes:

a determining unit configured to determine respective weights of the attention loss and the classification loss.

Supplement 8. An electronic device, including the apparatus according to any one of supplements 4-7.

Supplement 9. A training method of the deep learning model according to any one of supplements 1-3, the method including:

inputting a training image into the plurality of convolutional layers of the deep learning model;

calculating an attention loss according to the output result of the determination layer of the deep learning model and real values of positions where the preset objects of attention are located;

calculating a classification loss according to the output result of the fully-connected layer of the deep learning model and a preset real value of classification; and performing back propagation according to the attention loss and the classification loss, so as to adjust parameters of the plurality of convolutional layers and the determination layer of the deep learning model.

Supplement 10. The method according to supplement 9, wherein, the calculating an attention loss according to the output result of the determination layer of the deep learning model and real values of positions where the preset objects of attention are located includes:

calculating an accumulative value of differences between probabilities that the positions where the features output by the determination layer are located are the objects of attention and real values of the positions being the objects of attention to obtain the attention loss.

Supplement 11. The method according to supplement 9, wherein, the performing back propagation according to the attention loss and the classification loss, so as to adjust parameters of the plurality of convolutional layers and the determination layer of the deep learning model, includes:

performing back propagation according to a weighted sum of the attention loss and the classification loss, so as to adjust the parameters of the plurality of convolutional layers and the determination layer of the deep learning model.

Supplement 12. The method according to supplement 11, wherein the method further includes:

determining respective weights of the attention loss and the classification loss.

The invention claimed is:

1. A deep learning system used for image recognition, the system comprising:

a memory that stores a plurality of instructions; and a processor coupled to the memory and configured to execute the instructions to:

extract features from an input image in turn and output a plurality of feature maps of identical sizes at a plurality of convolutional layers;

according to positions where objects of attention in the input image are located, determine whether features related to positions contained in the feature maps are features of the positions where the objects of attention are located at a determination layer;

according to an output result of the determination layer, perform weight and composition processing on the features in the plurality of feature maps output by the plurality of convolutional layers, weights of the features of the positions where the objects of attention are located being different from weights of other features at a compositing layer, wherein, multiply the plurality of feature maps by the weights of the features related to positions contained in the feature maps to obtain the plurality of feature maps after being weight and composition processed at the compositing layer; and output a recognition result according to the plurality of feature maps after being weight and composition processed by the compositing layer at a fully-connected layer.

2. The deep learning system according to claim 1, wherein the deep learning system further comprises:

a long short-term memory layer provided between the compositing layer and the fully-connected layer;

and the input image comprises a temporally consecutive frame sequence.

3. A training apparatus of the deep learning system according to claim 1, the apparatus comprising:

a training memory that stores a plurality of instructions; and a training processor coupled to the training memory and configured to execute the instructions to:

input a training image into the plurality of convolutional layers of the deep learning system;

calculate an attention loss according to the output result of the determination layer of the deep learning system and real values of positions where preset objects of attention are located;

calculate a classification loss according to the output result of the fully-connected layer of the deep learning system and a preset real value of classification; and perform back propagation according to the attention loss and the classification loss to adjust parameters of the plurality of convolutional layers and the determination layer of the deep learning system.

4. The apparatus according to claim 3, wherein, the training processor is configured to calculate an accumulative value of differences between probabilities that the positions where the features output by the determination layer are located are the objects of attention and real values of the positions being the objects of attention to obtain the attention loss.

5. The apparatus according to claim 3, wherein, the training processor is configured to perform back propagation according to a weighted sum of the attention loss and the classification loss, to adjust the parameters of the plurality of convolutional layers and the determination layer of the deep learning system.

6. The apparatus according to claim 5, wherein the training processor is further configured to:

determine respective weights of the attention loss and the classification loss.

7. A training method of the deep learning system according to claim 1, the method comprising:

inputting a training image into the plurality of convolutional layers of the deep learning system;

calculating an attention loss according to the output result of the determination layer of the deep learning system and real values of positions where preset objects of attention are located;

calculating a classification loss according to the output result of the fully- connected layer of the deep learning system and a preset real value of classification; and performing back propagation according to the attention loss and the classification loss, to adjust parameters of the plurality of convolutional layers and the determination layer of the deep learning system.

8. The method according to claim 7, wherein, calculating an attention loss according to the output result of the determination layer of the deep learning system and real values of positions where the preset objects of attention are located comprises:

calculating an accumulative value of differences between probabilities that the positions where the features output by the determination layer are located are the objects of attention and real values of the positions being the objects of attention to obtain the attention loss.

9. The method according to claim 7, wherein,
performing back propagation according to the attention loss and the classification loss, to adjust parameters of the plurality of convolutional layers and the determination layer of the deep learning system, comprises:
performing back propagation according to a weighted sum of the attention loss and the classification loss, to adjust the parameters of the plurality of convolutional layers and the determination layer of the deep learning system.

10. A training apparatus of a deep learning system having a plurality of convolutional layers, a determination layer, and a fully-connected layer, the apparatus comprising:
a memory that stores a plurality of instructions; and
a processor coupled to the memory and configured to execute the instructions to:
input a training image into the plurality of convolutional layers of the deep learning system;
calculate an attention loss according to an output result of the determination layer of the deep learning system and real values of positions where preset objects of attention are located;
calculate a classification loss according to an output result of the fully-connected layer of the deep learning system and a preset real value of classification; and
perform back propagation according to the attention loss and the classification loss to adjust parameters of the plurality of convolutional layers and the determination layer of the deep learning system.

11. The apparatus according to claim 10, wherein,
the processor is configured to calculate an accumulative value of differences between probabilities that the positions where features output by the determination layer are located are the objects of attention and real values of the positions being the objects of attention to obtain the attention loss.

12. The apparatus according to claim 10, wherein,
the processor is configured to perform back propagation according to a weighted sum of the attention loss and the classification loss, to adjust the parameters of the plurality of convolutional layers and the determination layer of the deep learning system.

13. The apparatus according to claim 12, wherein the processor is further configured to determine respective weights of the attention loss and the classification loss.

14. A training method of a deep learning system having a plurality of convolutional layers, a determination layer, and a fully-connected layer, the method comprising:
inputting a training image into the plurality of convolutional layers of the deep learning system;
calculating an attention loss according to an output result of the determination layer of the deep learning system and real values of positions where preset objects of attention are located;
calculating a classification loss according to an output result of the fully-connected layer of the deep learning system and a preset real value of classification; and
performing back propagation according to the attention loss and the classification loss, to adjust parameters of the plurality of convolutional layers and the determination layer of the deep learning system.

15. The method according to claim 14, wherein,
calculating an attention loss according to the output result of the determination layer of the deep learning system and real values of positions where the preset objects of attention are located comprises:
calculating an accumulative value of differences between probabilities that the positions where features output by the determination layer are located are the objects of attention and real values of the positions being the objects of attention to obtain the attention loss.

16. The method according to claim 14, wherein,
performing back propagation according to the attention loss and the classification loss, to adjust parameters of the plurality of convolutional layers and the determination layer of the deep learning system, comprises:
performing back propagation according to a weighted sum of the attention loss and the classification loss, to adjust the parameters of the plurality of convolutional layers and the determination layer of the deep learning system.

* * * * *